(12) United States Patent
Hirsch

(10) Patent No.: US 8,396,818 B2
(45) Date of Patent: Mar. 12, 2013

(54) OPERATING A COMMUNICATIONS NETWORK

(75) Inventor: Lucian Hirsch, München (DE)

(73) Assignee: Siemens Aktiengesellschaft, Munich (DE)

(*) Notice: Subject to any disclaimer, the term of this patent is extended or adjusted under 35 U.S.C. 154(b) by 462 days.

(21) Appl. No.: 12/449,666

(22) PCT Filed: Feb. 14, 2008

(86) PCT No.: PCT/EP2008/051801
§ 371 (c)(1),
(2), (4) Date: Aug. 20, 2009

(87) PCT Pub. No.: WO2008/101859
PCT Pub. Date: Aug. 28, 2008

(65) Prior Publication Data
US 2010/0332432 A1    Dec. 30, 2010

(30) Foreign Application Priority Data
Feb. 20, 2007    (EP) .................................. 07003511

(51) Int. Cl.
*G06E 1/00*    (2006.01)
*G06E 3/00*    (2006.01)
*G06F 15/18*    (2006.01)
*G06G 7/00*    (2006.01)

(52) U.S. Cl. ........................................... 706/21
(58) Field of Classification Search ............ 706/21, 706/15, 16, 62
See application file for complete search history.

(56) References Cited

U.S. PATENT DOCUMENTS

| 5,720,003 | A | 2/1998 | Chiang et al. |
| 6,088,804 | A * | 7/2000 | Hill et al. .................. 726/25 |
| 6,353,902 | B1 | 3/2002 | Kulatunge et al. |
| 6,879,971 | B1 | 4/2005 | Keeler et al. |
| 2005/0222811 | A1 | 10/2005 | Jakobson et al. |

FOREIGN PATENT DOCUMENTS

| GB | 2421656 A | 6/2006 |
| WO | WO 0036788 A2 | 6/2000 |

OTHER PUBLICATIONS

Gardner R. D. et al.; Alarm Correlation and Network Fault Resolution Using The Kohonen Self-Organising MAP; IEEE Global Telecommunications Conference, Phoenix, Arizona, Nov. 3-8, 1997, Global Telecommunications Conference (Globecom), vol. 3, pp. 1398-1402; New York; IEEE; US, ISBN: 0-7803-4199-6.

* cited by examiner

*Primary Examiner* — Jeffrey A Gaffin
*Assistant Examiner* — Ilya Traktovenko
(74) *Attorney, Agent, or Firm* — Staas & Halsey LLP (57) ABSTRACT

In operating a communications network, a set of derived events occurs in dependence on at least one primary event in the communications network. A learning method for determining the set of derived events by analyzing the at least one primary event and by predicting the set of derived events based on relations concerning network entities and/or events in the communications network is implemented to support the management of the communications network in a more efficient way.

23 Claims, 4 Drawing Sheets

OPERATING A COMMUNICATIONS NETWORK

CROSS REFERENCE TO RELATED APPLICATIONS

This application is based on and hereby claims priority to PCT Application No. PCT/EP2008/051801 filed on Feb. 14, 2008 and EP Application No. EP07003511 filed on Feb. 20, 2007, the contents of which are hereby incorporated by reference.

BACKGROUND OF THE INVENTION

The present invention relates to operating a communications network like a telecommunications network, for example. In particular, the present invention relates to operating a communications network, wherein a set of derived events occurs in dependence on at least one primary event in the communications network. Further, the present invention relates to a method, to a computer reliable storage medium, to a system, and to entities of the communications network enabling the operating the communications network.

Figure 1:
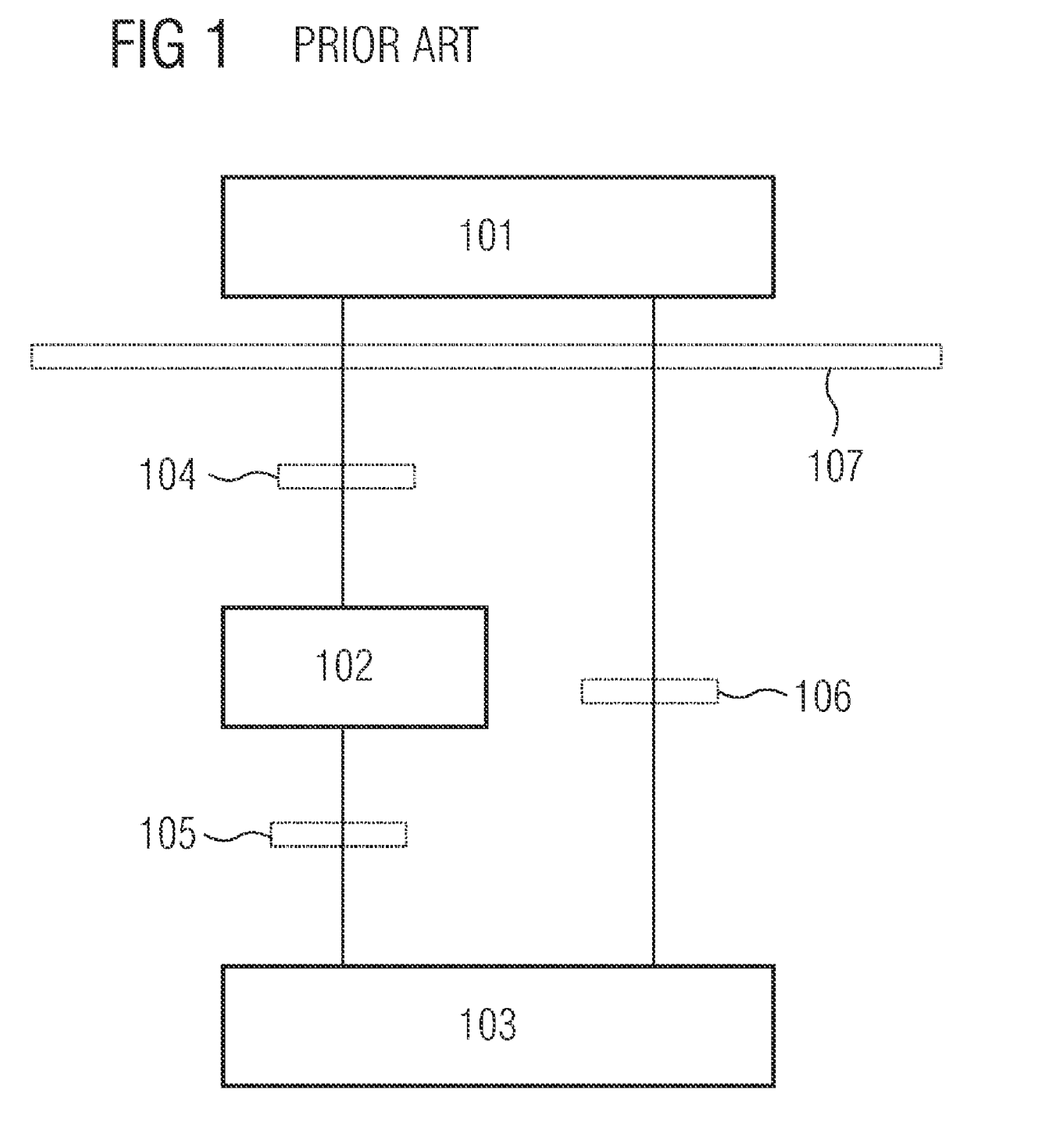
FIG. 1 presents a design of a conventional management network in a communications network.

A typical management network of a communications network comprises several levels for managing the communications network, for example a telecommunications network. In a management network of a communications network, every level has a certain management and/or communications network specific functionality being specific for this level and often depending on the (hierarchical) position of the layer in the management network. Each of these hierarchical levels, with the exception to the top level and the first-line level, has a double management function—manager function and agent function. Each level of the management network, with the exception of the first-line level, has a manager function with regard to the underlying level, and each level of the management network, with the exception of the top level, has an agent function with regard to the level before. Thus, a management of a communications network features a kind of hierarchical structure clearly defining the functions at every level of the management network of this communications network. See an example provided in FIG. 1 representing three levels of a (hierarchical) management structure in a telecommunications network and described below.

Each level of the management network comprises corresponding entities or elements being of physical and/or abstract nature. Thus, an entity of a hierarchical level can be a software and/or hardware (device) in a communications network. In the following, such entities or elements will be referred to as "network entities". Depending on the level of the management network performing a functionality of a manager or an agent, or both, these network entities are managers, agents, or both. In the following, the terms manager or agent will be used in dependence on the functionality of the corresponding level of the management network and, thus, in dependence on the corresponding network entity of this level. For this reason, if a level of the management network represents both the manager and the agent level, a network entity comprised in this level will be a manager or an agent depending on the function to be performed in a given moment by this network entity.

Network management as such often refers to the Operation, Administration, and Maintenance (OAM) of communications networks like telecommunications networks at the top level. Network management is the execution of a variety of functions required for controlling, planning, allocating, deploying, coordinating, and/or monitoring the resources of a network, including performing functions such as initial network planning, frequency allocation, predetermined traffic routing to support load balancing, cryptographic key distribution authorization, configuration management, fault management, security management, performance management, bandwidth management, and/or accounting management. Further, in such a management system hardware and/or software are provided that support OAM functionality and provide these functions, for example, to network users and/or administrators. Thus, OAM includes facilities for operating, managing and maintaining networks.

Managers in a communications network are configured to start operations for the operation, administration and maintenance of the communications network. It is done by sending requests, which are performed by the agents, in particular, by the agents assigned to the corresponding managers. The managers receive then corresponding feedbacks, called responses, from the agents.

Network entities implementing the functionality of an agent in the communications network recognize events in the communications network relevant for the operation, administration and maintenance of the communications network (e.g. alarms), generate corresponding notifications, and transmit these notifications, usually as event reports, to the managers, in particular, to the managers the network entities are assigned to. Thus, an efficient network management is enabled.

An event mostly refers to changes in a system or communications network, which provoke a pre-defined reaction from a network entity. The occurrence of an event in a communications network is not predictable. Often it appears or occurs with a special set of circumstances in the communications network like performance bottlenecks, changes with regard to the configuration of the network, addition of new network entities, or faults in the communications network. An event is like a phenomenon located at a single point in space-time. Further an event can be a cause for one or more than one subsequent events in the communications network. In the following, events being not caused by other events in the communications network will be referred to as "primary events", and events being caused by at least one previous event will be referred to as "derived events".

The communication between the levels of a management network and thus between the managers and the agents is usually facilitated by management interfaces, called OAM interfaces. The implementation of these interfaces can be performed, for example, by appliance of protocols like Simple Network Management Protocol (SNMP), Transaction Language 1 (TL1), Extensible Markup Language (XML), or Common Object Request Broker Architecture (CORBA).

When considering FIG. 1, presenting a design of a conventional management network in a communications network like a telecommunications network, three levels of a hierarchical management structure are presented: the network element (NE) level 103, the element manager system (EMS) level 102, and the network manager system (NMS) level 101. According to the hierarchical structure of a conventional management network, the NE level 103 is managed by the EMS level 102, and the EMS level 102, in turn, is managed by the NMS level 101.

Each of the levels 101, 102, and 103 comprises corresponding network entities like network managers (NMs), element managers (EMs) being often manufacturer specific, and network elements (NEs). Each NE is managed by a certain EM, and each EM is managed by a certain NM. An NM, in turn, manages at least one EM, and an EM manages at least one NE in the communications network.

As already outlined above, the communication between the levels of a management network of a communications network and the corresponding network entities of the communications network is performed by specific interfaces between these levels. The connections between the levels 101, 102, 103 in FIG. 1 are outlined by lines between them. The communication between the NE level 103 and the EMS level 102 can be implemented by EM-NE-interfaces 105, the communications between the EMS level 102 and the NMS level 101, in turn, can be implemented by NM-EM-interfaces 104.

The recent developments of communications networks provide also direct NM-NE-interfaces 106 enabling direct communication between the NE level 103 and the NM. This is the case, for example, with regard to the standardizing activities of the 3rd Generation Partnership Project (3GPP), where an interface 107 standardized from the point of view of the NMS and called the "northbound interface" or Itf-N respectively has been introduced.

Thus, when managing a NE in a communications network, it is assumed that the management function can be performed either by an EM or by an NM.

A (tele-) communications network comprises a variety of network entities being capable of producing event reports or messages like alarm reports, for example. Further, in a (tele-) communications network exist several kinds of dependencies between the several network entities. For this reason, an event at one network entity in a (tele-) communications network may be a cause for further events in the same and/or in further network entities. As already outlined above, the event appearing at first will be referred to as "primary event" and the further events being caused by the primary event will be referred to as "derived event".

These dependencies between events (based on dependencies between the network entities on the network configuration in general, for example) have to be visible to the corresponding managing layers or to the network management in general to allow a fast and efficient reaction to these events and to enable an efficient OAM of the communications network.

When turning to a more concrete example, a report of a primary event (e.g. alarm report) for a network entity (A) can be a cause for at least one further report of at least one further derived event (e.g. alarm reports, event reports concerning state changes, reports concerning changes of values of attributes, reports concerning relationship changes) for the network entity A and/or for further network entities (B, C, D, . . . ). To achieve an efficient management, control and/or monitoring of a communications network, the concerning reports have to be correlated in such a way in the relevant network entities, that the dependencies between the corresponding events are reflected in a well coordinated and clear way. Such correlations of event reports are mostly implemented by use of standardized parameters like "notification identifier" and "correlated notifications", for example, wherein each report of a derived event comprises in its "correlated notification" parameter at least one (unique) "notification identifier" value of the corresponding at least one primary event. These dependencies between the events and/or event reports are provided by large data sequences comprising the corresponding parameter data.

The reports of derived events are important for the managing levels or for operators to derive a complete view of a state of a communications system. However, the transmission and use of such large data sequences providing overview of event dependencies and being an important help when managing a communications network on one hand, provide also disadvantages on the other hand because of their data volume. Thus, the use of such sequences being provided from the lower or agent levels to the upper or managing levels are cause for reduced performance of the involved network entities. Further, they are an additional cause for heavy data traffic and stress the functionalities of the involved interfaces. Additionally, as the correlation of event reports reflects the corresponding events being involved in the sequence of primary and derived events in the same and equal way, it is hard to differentiate at first the importance of the several events for a certain state of the communications network. Thus, the managing levels and/or operators can be distracted from the important events to less important or dispensable events.

SUMMARY

It is one potential object to improve the operation of a communications network.

The inventor proposes a method of operating a communications network, wherein a set of derived events occurs in dependence on at least one primary event in the communications network, the method comprising implementing of a learning method for a determining of the set of derived events by analyzing the at least one primary event and by predicting the set of derived events based on data comprising relations concerning network entities and/or events in the communications network.

According to an embodiment, the method further comprises at least one of:
collecting and/or structuring of the data; and
supporting management of the communications network by use of knowledge derived by the learning method.

The collecting and structuring data comprising relations concerning network entities and/or events in the communications network allows a targeted access to data relevant for the operating the communications network.

Further, when implementing a learning method for a determining of a set of derived events for at least one given primary event, an implementation of a self learning management system is enabled in the communications network, wherein the implementation can be performed in at least one appropriate managing level (e.g. NMS level or EMS level) of the management network of the communications network. By use of such a self learning management system and/or knowledge derived by the learning method the management of the communications network can be supported in a very efficient way. The self learning management system and/or the knowledge about the dependencies and their consequences in the communications network (both concerning network entities and/or network events) enables to provide a complete overview with regard to several states possible in the communications network. Thus, it is not necessary to generate and/or transfer (huge) data sequences comprising information about primary events and their derived events through several levels of the management network of a communications network, as outlined above. The method uses the self learning management system and/or the knowledge derived by the learning method to determine derived events for a primary event and to provide them to the corresponding managing entity and/or operator. Furthermore, the self learning management system and/or the appropriate use of the knowledge derived by the learning method enables also a determining of at least one event and/or at least one command to be initiated and/or implemented in the communications system in response to at least one primary event and/or to a corresponding set of derived events.

In such a way, the heavy traffic between the several levels in a management network of a communications network can be reduced. Further, the performance of the network entities of lower levels can be increased, as less data has to be analyzed or transferred. Further, such a management system and/or the appropriate use of the knowledge derived by the learning method enables well differentiating between important and less important events and/or network entities with regard to at least one certain state in a communications network.

According to an embodiment, the method can be in a managing level of a management network of the communications network. However, several implementation possibilities are enabled, as the steps of the method can be implemented separately in a parallel and/or sequential way, and as in such a way several entities of several levels of a management network of the communications network can be exploited for this purpose.

When considering the collecting and structuring of data, according to an embodiment, this step or stage of the method may comprise a first collecting of network entity related dependency data and a second collecting of network configuration related data. Thus, a well basis with regard to analysis of dependencies between network entities and/or events can be provided.

Further, the collecting of data may comprise a first generating for generating a base set of primary events based on at least one of the following: the first collecting and the second collecting. Thus, well founded information about primary events possible in the communications system can be provided.

Additionally, the collecting of data may comprise a second generating for generating at least one of the following: a base set of operator information and a base set of derived events, wherein an operator information in the base set of operator information is connected to at least one primary event of the base set of primary events, and wherein a derived event in the base set of derived events is connected to at least one primary event of the base set of primary events. Thus, a detailed description of the primary events and their dependencies can be provided, important when aiming at providing a well founded overview of a communications network in a certain situation or state.

When turning to the implementing of the learning method, the implementation comprises at least one prediction of a set of predicted derived events for at least one primary event, a comparison of the set of predicted derived events with the set of derived events (performed in the communications system with regard and as reaction to the at least one primary event), and an updating of the set of predicted derived events, if differences are identified by the comparison. Thus, the predicted derived events are compared with derived events, actually performed in the communications network as consequence of the at least one primary event, wherein, if false or misinterpreted derived events have been predicted, a correction or update, respectively, is possible to improve the learning process or method in a next step or cycle of learning.

Furthermore, the set of derived events used for the above mentioned comparison purpose can be provided by at least one network entity to which the set of derived events and/or the at least one primary event corresponds.

Additionally, the set of derived events used for the above mentioned comparison purpose can be provided by a collecting step, implemented by at least one collecting unit, related to at least one network entity to which the set of derived events and/or the at least one primary event corresponds. According to an embodiment, in the collecting step derived events of a communications network are collected at least temporarily by the at least one collecting unit, meaning that it is not necessary to store these events for a long time. Thus, the resources of a communications network can be exploited efficiently. Additionally, the comparison of the predicted derived events and the actually performed derived events has not be done always, when a certain primary event has been chosen for the learning purpose, it can be done with regard to at least one interval of time or more or less regularly after a certain time interval. Thus, the computing time and capacity can be saved without loss of quality, as the learning method still continues the learning or the prediction of derived events.

The collecting step (and thus also the at least one collecting unit) can be implemented in an agent level of a management network of the communications network. Thus an efficient communication between the network entities the derived events are related to and the collecting unit can be performed, as no inter-level data exchange leading to heavy traffic or performance bottlenecks is required. The collecting unit can be a kind of database or a log file. Here, several possibilities will be apparent to the person skilled in the art.

Further, the implementing of the learning method may comprise a determining of at least one event and/or at least one command, wherein the at least one event and/or the at least one command is determined in response to the at least one primary event and/or to the set of derived events in the communications system. Thus, besides the prediction of derived events also reacting to the primary and/or derived events in a communications system can be learned. Thus, a manifold and well founded support for the management of a communications system can be provided after the implementation of learning method or stage.

Additionally, the implementing of the learning method may comprise an annotation of correctly predicted derived events and/or of a number of correctly predicted derived events. When noting the correctly predicted derived events, it becomes possible to determine the quality or success of the learning method or stage.

The implementing of the learning method could be terminated, if the annotation provides a result indicating a good quality prediction. According to an embodiment the termination can be performed when a certain account of correctly predicted derived events is reached in every cycle of the learning method within a certain time period.

As already outlined above, the supporting of managing a communications network by appropriate use of the knowledge derived by the learning method can comprise determining of at least one event and/or at least one command to be initiated and/or implemented in the communications system in response to the at least one primary event and/or to the set of derived events.

Additionally, this object is achieved by a computer program product comprising code for producing at least the step of implementing a learning method as outlined above. Further, at least one of the further steps of the above outlined method can also be produced by code comprised in the computer product. According to an embodiment, the computer program can optionally be embodied in a computer-readable medium. The implementation of the method outlined above or of at least one of the steps of the method outlined above by a computer program product provides the advantage of flexible incorporation of the method in a communications network. Thus, the implementation of the method can be performed by several modules working in a parallel and/or sequential way. Further, it becomes possible to exploit several network entities in several management levels in a communications network to implement the method or at least one step of the method.

Further, this object is achieved by a system for operating a communications network, the system comprising at least one first entity configured to implement the learning method for a determining of a set of derived events, as outlined above, by analyzing at least one corresponding primary event and by predicting the set of derived events based on data comprising relations concerning network entities and/or events in the communications network, as already outlined above.

Further, according to an embodiment, the system may further comprise at least one of:
- at least one second entity in the communications network configured to implement collecting and/or structuring of the data comprising relations concerning network entities and/or events in the communications network, as outlined above; and
- at least one third entity configured to implement supporting of the management of the communications system, as outlined above, by use of knowledge derived by the learning method.

According to an embodiment, at least one of the first, second, and third entity can be an entity of a managing level of a management network of the communications network. Further, the first entity may correspond to the second entity, the first entity may correspond to the third entity, the second entity may correspond to the third entity, or the first entity corresponds to the second and the third entity. Thus, as already pointed out above, a high flexibility with regard to the implementation of the system (the self learning management system) can be provided. The implementation of the functions of each of the entities of the system corresponds to the implementation of the steps and/or stages of the method outlined above.

Furthermore, this object is achieved by a data structure for collecting data comprising relations concerning network entities and/or events in a communications network, wherein the data structure comprises a set of primary events and at least one of: a set of operator information and a set of derived events, wherein an operator information in the set of operator information is connected to at least one primary event of the set of primary events, and wherein a derived event in the set of derived events is connected to at least one primary event of the set or primary events. The data structure can be configured to collect data by incorporating network entity and/or event related dependency data and/or network configuration related data. The provision of such a structure provides a well basis for an efficient implementation of the learning method outlined above, as it provides structured background information when predicting derived events and/or when deciding on events and/or commands serving as reactions to the primary and/or derived events in the communications network.

The design of the data structure can be like the one described with the collecting and/or structuring step and/or stage of the method pointed out above. For this reason, the data structure can be filled with the data comprising relations concerning network entities and/or events in the communications network by use of this collecting and/or structuring step and/or stage. A more detailed description of the filling of the data structure and of the possible data comprised in the data structure will be provided below with a more concrete embodiment provided by FIG. 2.

Additionally, this object is achieved by a use of the data structure, as outlined above, in a learning method for a determining of a set of derived events of at least one primary event in a communications network, wherein the set of derived events occurs in dependence on the least one primary event in the communications network. In particular, this learning method can be implemented at least similarly to the implementation of a learning method according to the method for operating the communications network outlined above.

Further, this object is achieved by a network entity in a communications network, wherein the network entity is configured to manage data comprising relations concerning network entities and/or events in the communications network by use of the data structure outlined above. According to an embodiment, the network entity can be located in a management level of the management network of the communications network. This provides the advantage, that the managing entities will have a fast and comfortable access to management relevant data, when trying to get an overview with regard to a situation or state in a communications network or when deciding on necessary actions to be initiated and/or implemented in the communications network.

Additionally, this object can be achieved by a data container configured to manage data based on the data structure outlined above. According to an embodiment, the data container can be located in a management level of the management network of the communications network, wherein a similar advantage to the one provided above can be enabled. Further, this data container can be a database or other structure for collecting and/or managing data in an appropriate way. Here several possibilities of implementation will be apparent to a person skilled in the art.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

In the following the proposed method will be explained by presenting the steps of the methodology for operating a communications network according to an embodiment of the proposed method. As already pointed out above, it is not necessary to perform each of the steps by one network entity only. Thus, the use of several network entities in several layers of a management network of a communications network is possible. Here, a person skilled in the art will be able to recognise this fact and to implement the outlined methodology according to the needs of this person skilled in the art and according to the needs of the corresponding communications network. The steps may be performed and/or the responsible network entities may act in a parallel and/or in a sequential way. Thus, for example, it is possible that data is collected by a network entity (e.g. to refresh of update data), wherein another and/or the same network entity implements the support of the management of the communications network as outlined above. For this reason, the steps or stages of the methodology outlined also above may be seen also as separate methods, which can be implemented by separate network entities.

At first, according to the present embodiment data comprising relations concerning network entities and/or events in the communications network is collected and/or structured.

To manage (logical) dependencies between events and/or network entities in a communications network and, consequently, to generate and/or predict corresponding derived event reports after an occurrence of a prior (primary) event, a network entity uses for this purpose as a basis information or data reflecting dependencies between network entities and network configuration related information or data. As regards the network entity related dependency data, dependency graphs (directed graph of dependencies) being specific for each kind or category of network entities can be exploited. As regards the network configuration related data, information about the configuration of the communications network in general and/or containment relationships between the network entities may be used. Here, for example, the management information tree (MIT) could be exploited for this purpose. It has to be noted that a person skilled in the art will be able to detect similar structures or data in the communications network, thus the method is not restricted to the use of dependency graphs or MIT only.

Thus a first collecting of network entity related dependency data and/or a second collecting of network configuration related data can be performed.

In the next step and/or stage, the corresponding data, the dependency graphs of at least one (kind of) network entity and data reflecting current network configuration is used as a basis for collecting and/or structuring data needed and used as basis for the implementation of the learning method.

Figure 2:
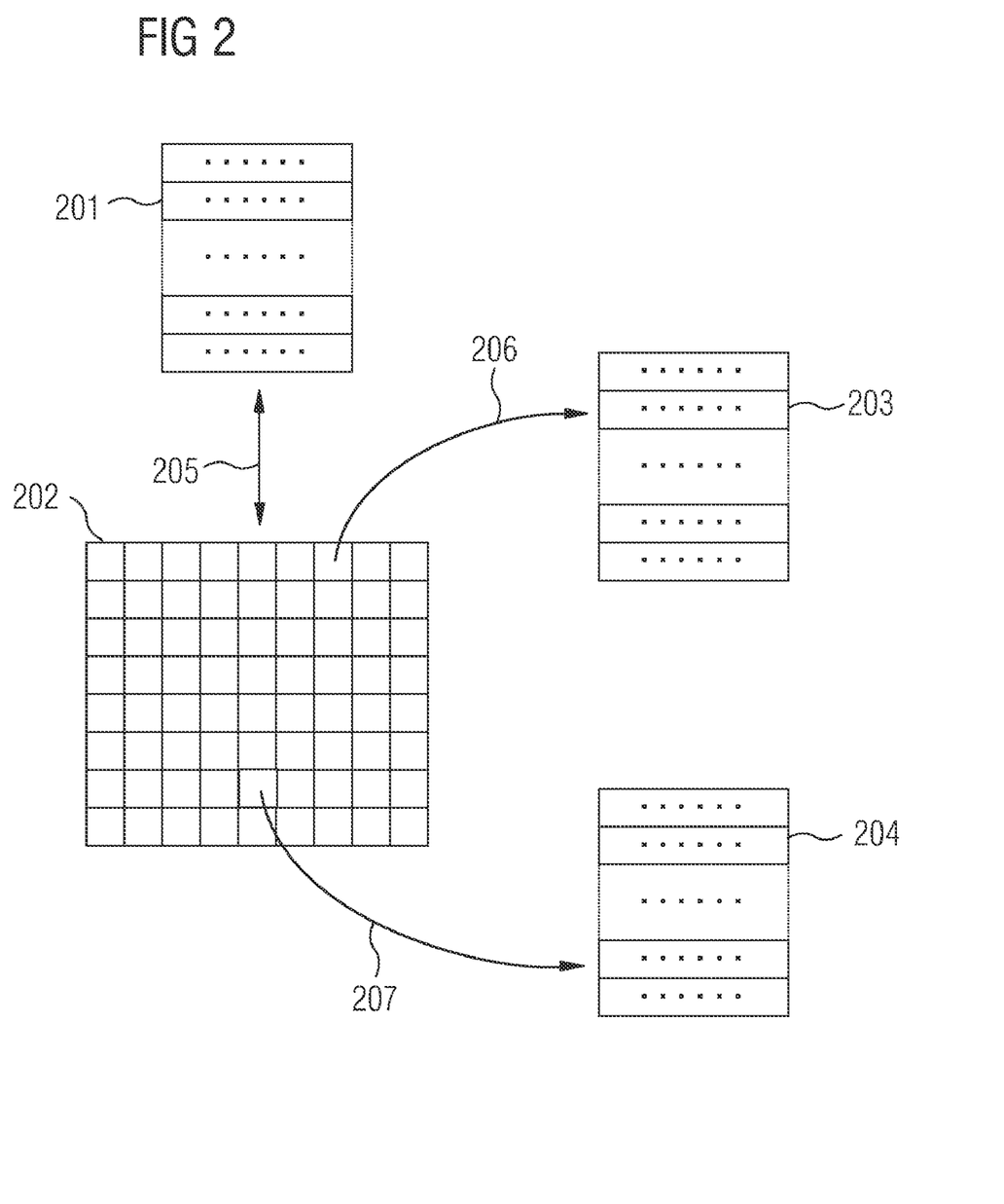
FIG. 2 presents a data structure for collecting data according to an embodiment of the proposed method.

FIG. 2 presents a data structure for collecting data according to the embodiment of the method and used for the collecting and/or structuring purposes, as well for the implementation of the learning method. In general, this data comprises relations concerning network entities and/or events in the communications network.

In a further step and/or stage a base set of primary events based on network entity related dependency data and/or network configuration related data is build. In FIG. 2 the primary events are collected in a table 202, comprising a variety of data for every primary event. This table may comprise, for example, information and/or data about the kind or category of the network element being in relation with the primary event; the managed object class (MOC) and the managed object instance (MOI) of the network entity being enabled to generate a report of primary event; the kind or type of the primary event (event type); parameters specific for the primary event (e.g., when regarding alarms parameters like the standardized ones: "perceivedSeverity", "probableCause", and/or "specificProblems") and/or reflecting the situation or state of the communications network at the moment as the primary event occurred.

In the FIG. 2 also the MIT used as one possible basis, when collecting and/or structuring data relevant for the learning method is performed, is visualised by a table or array 201. The relation of MIT 201 and the collected primary event data 202 is pointed out by the arc 205.

In a further step and/or stage information provided by operator or the managing level, in following referred to as base set of operator information, related to at least one primary event can be collected. In FIG. 2 this base set of operator information is provided as a table or array 204. In the base set of primary events 202 at least one pointer 207 can be provided to reflect the relation 207 between the at least one primary event in the base set of primary events 202 and the at least one operator and/or managing level information in the base set of operator information 204. Further, derived events occurring as a consequence of at least one primary event may be collected in a base set of derived events 203. In the base set of primary events 202 at least one pointer 206 can be provided to reflect the relation 206 between the at least one primary event in the base set of primary events 202 and the at least one derived event in the base set of derived events 203.

Thus, in this step and/or stage at least one of the following: a base set of operator information and a base set of derived events are generated and/or filled with respective data.

A base set of derived events 203 may comprise the following data: reference to at least one corresponding primary event; MOC and/or MOI being relevant for the corresponding primary event; the kind of the event; and/or parameter or other data specific for the derived event.

As regards the relations 206, 207 between the primary event data 202 and the base set of derived events 203 or the base set of operation information 204, the arcs 206 and 207 reflecting these pointers or relations do not represent just a one direction relation. When implementing the data structure, the steps, and/or the corresponding network entities, the linkage in both directions 202 to 206 and/or to 207 as well in either one of the directions can be implemented by appropriate mechanisms like pointers or intermediate data structures. This implementation will be apparent to person skilled in the art in dependence on the current situation concerning the implementation.

The data structure can be managed by a data container like a database. However, also here several further possible structures can be used. Additionally at least one network entity of the communications network can be used to manage data comprising relations concerning network entities and/or events in the communications network by use of the data structure. As the management of the events is performed in a managing level in a communications system, the network entity can be in a management level of a management network of the communications network to simplify the data exchange required, when implementing further the learning method using the data.

Thus, when the data comprising relations concerning network entities and/or events in the communications network has been collected and/or structured, meaning that it is available for further computations, the implementation of the learning method for determining of a set of derived events by analyzing at least one primary event and by predicting the set of derived events based on this collected data can be started.

Figure 3:
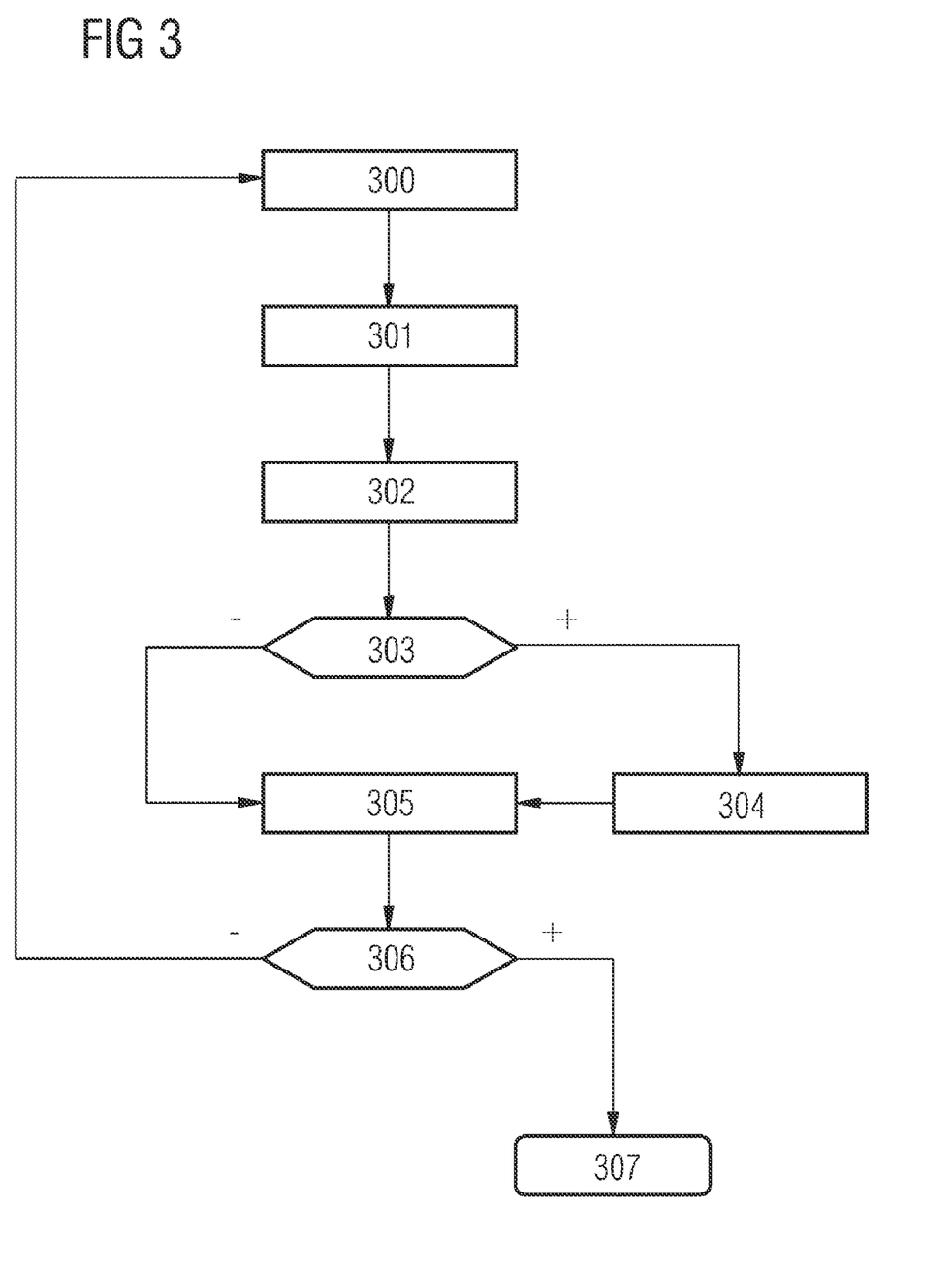
FIG. 3 presents the steps used for implementing a learning method according to an embodiment of the proposed method.
Figure 4:
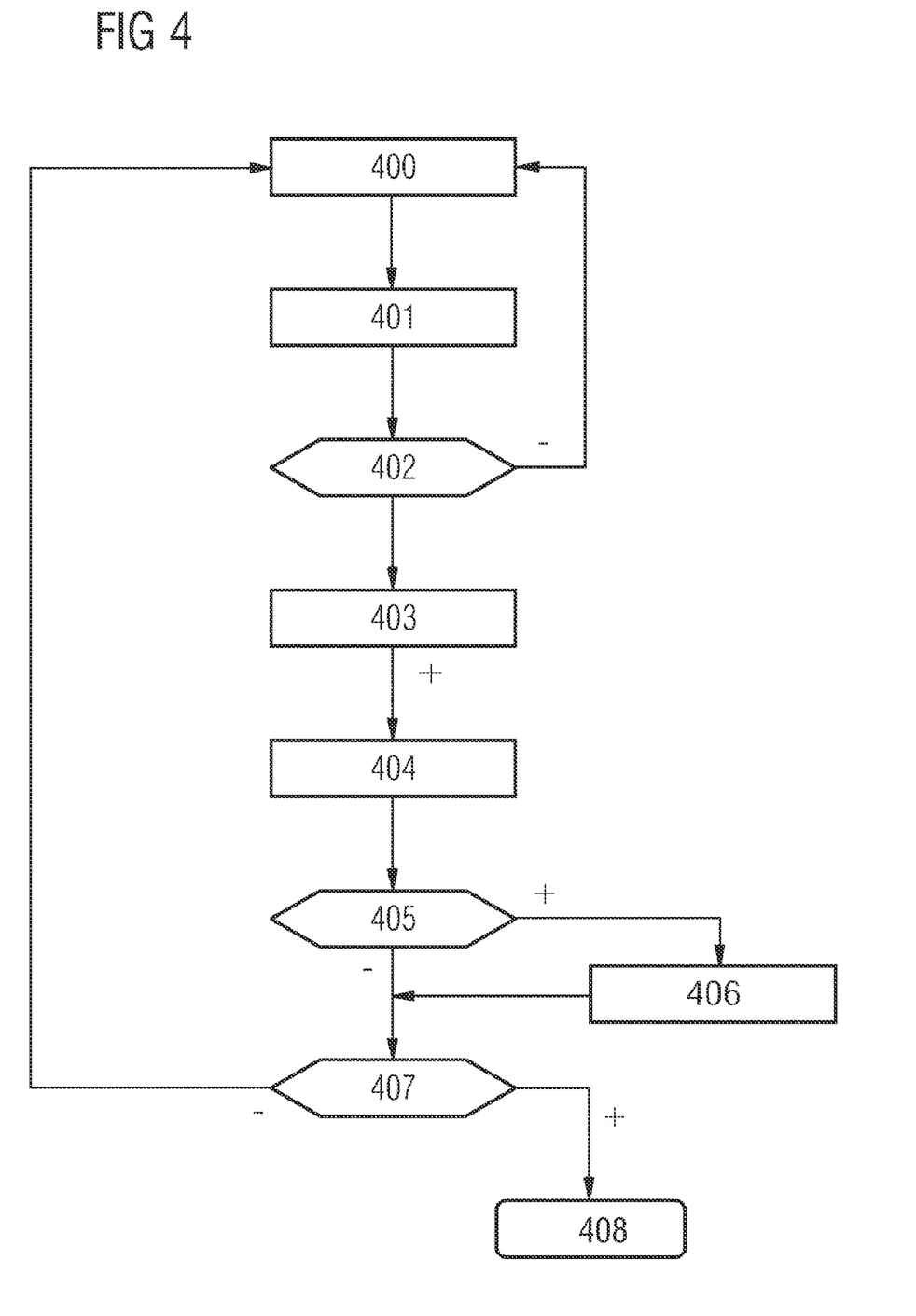
FIG. 4 presents the steps used for implementing a learning method according to a further embodiment of the proposed method.

FIGS. 3 and 4 present the steps used for implementing a learning method according to embodiments of the proposed method.

The method can comprise 2 main steps and/or stages of implementation, wherein it is also possible to implement the method also by use of just one of both main steps and/or stages. The performance of both can, however, improve the quality of the knowledge acquired during the learning process, as two results of two learning steps and/or stages are then build on each other, in particular, when implementing the second learning main step based on the knowledge derived by the first learning main step.

In following these main steps and/or stages will be referred to as "the first main stage" and "the second main stage". However, these denotations comprising "first" or "second" should not be seen as predetermined sequential order. There, several orders and several combinations are possible.

When considering the first main stage of the learning method provided by FIG. 3, in a first step, network entities of an agent level, like NEs, for example, generate all primary and derived events possible in a communications network and provide this data to a managing level or to corresponding manager, respectively. The reports concerning the events are provided to the managing level or to the corresponding manager, and/or to the operator. Further, the data as collected and/or structured in the previous embodiment, for example, is used.

Based on the data structure, with each data request and with each corresponding receiving 300 of the data comprising the information about a primary event, the manager generates a prediction or predicts 301 a set of predicted derived events for the primary event received. Subsequently, the set of predicted derived events is compared 302 with a set of derived events actually occurring in the communications system in dependence on and/or to response to the primary event, for which the prediction was performed. The set of derived events occurring in the communications system in dependence on and/or to response to the primary event is received from the network entity, here NE, to which the primary event corresponds. If differences are identified 303 by the comparison 302, the set of predicted derived events is updated 304. In FIG. 3 this way is introduced by the sign "+", meaning, that differences exist. In the updating 304, the set of predicted derived events is updated by updating the corresponding predicted derived events related to the primary event and, if additionally information from operator is available, by updating the information from the operator related to the primary event.

Depending on the result of the comparison 302, a predetermined threshold $S_{NE-1}$, which may be specific for a kind of network entity or for a network entity itself to which the primary event relates, is updated 305. The threshold $S_{NE-1}$ can be seen, for example, as a hit rate, as a percentage of desired correct hits. Additionally, the threshold $S_{NE-1}$ can also depend on the degree of importance of the corresponding kind of network entity of for a network entity in the communications network. Here, several conditions in dependence on the network entity and/or the event can be used with regard to the threshold $S_{NE-1}$.

If the threshold $S_{NE-1}$ is exceeded 306 continuously for a minimum time $T_{NE-1}$, the first main stage of the learning method can be terminated 307. Otherwise, the learning process is continued by starting with a receiving 300 of a new primary event, for which a new prediction 301 and the further steps have to be performed.

When considering the second main stage of the learning method, the manager or the operator can send a request to all network entities (e.g. all NEs or NEs of a certain type in an agent layer) to stop forwarding derived events actually occurring in the communications network in dependence on and/or to response to a primary event. Thus, it is indicated, that the second main stage will be performed and that according to this stage the corresponding derived events actually occurring in the communications network in dependence on and/or to response to a primary event will be stored and/or collected in collecting unit like a dedicated log. The dedicated log can be comprised in a network entity. According to the present embodiment the dedicated log used as collecting unit is stored in a network entity, NE, to which the primary event corresponds.

Thus, in the second main stage outlined in FIG. 4, the managing level or the manager, respectively, receives event reports or data referred to primary events only.

In particular, after receiving 400 data comprising the information about a primary event according to the present embodiment (like the first main stage), in the second main stage the manager generates a prediction or predicts 401 a set of predicted derived events for a primary event received (like the first main stage). This step is implemented several times, wherein each time, to check the accurateness and thus the quality of the prediction performed, it is checked 402 whether a certain interval of time is passed. If a certain predetermined interval of time is over, the derived events collected in a collecting unit (here a dedicated log, for example) by the collecting step are read 403 and then compared 404 with the predicted derived events. If there are differences 405 between the derived events collected in the collecting unit and being occurring in the communications network in dependence on the primary event received and the predicted derived events, the set of predicted derived events is updated 406 with respect to the derived events of the collecting unit. Additionally, the operator can be informed about the differences. After that, like the first main stage, a threshold $S_{NE-2}$, having a definition like $S_{NE-1}$ and being higher than the threshold $S_{NE-1}$ for prediction quality ensuring purposes, and the number of correctly performed predictions are compared 407. If the threshold $S_{NE-2}$ has been exceeded for a minimum time $T_{NE-2}$, the second main stage of the learning method can be terminated 408. Otherwise, the learning process is continued by starting with a receiving 400 of a new primary event.

Additionally, the second main stage can be expanded by introducing a step of predicting or determining of commands (e.g. test requests, commands advising a reconfiguration of a network etc.). These predicting results or suggestions can then be examined and valued at a managing level or by an operator. When deciding on positive hits during the prediction, the accurateness of the prediction of commands can then be incorporated in this deciding.

After the implementation of the learning method, the knowledge derived by implementing of the learning method can be used to support the management of the communications system.

The management level or a manager, respectively, or the operator can send a request to all network entities of an agent level (like NEs) or to all network entities of the same category or type to stop creating of derived events. There, a request like "stopCreateDerivedEvents" could be sent. After receiving the request, the corresponding network entities of an agent level would stop not only the transmission but also the generation of the derived events and/or of the data related to the derived events (like derived event reports) to the upper or management levels.

Thus, by trusting the self learning management system it can be enabled that the network entities of agent levels and the interfaces used for communication between the level are relieved. Additionally, by use of the self learning management system as outlined it becomes also possible to predict commands dealing with effects of primary events, wherein the commands just have to be acknowledged by the managing entities and/or by the operator.

An additional flexibility can be provided by allowing adjusting of the values $S_{NE-1}/T_{NE-1}$ and $S_{NE-2}/T_{NE-2}$ per category or type of a network entity like NE or per network entity itself. This adjusting can be implemented, for example, by setting corresponding parameters and values in a configuration file.

Furthermore, according to an embodiment, if network entities of the configuration of a communications network are changed (e.g. upgrades of network entities like NEs or if new primary and/or derived events occur in the communications network), a new learning can then be started to adapt the self learning managing system to the new conditions in the network. In such a case, a request to resume derived events (like "resumeDerivedEvents) could be sent by a managing level to request all network entities of agent levels (like NEs) to start generating of derived events again and to send them to the managing levels. In this case a new implementation of the learning method as outlined above would be started.

In addition to the advantages, already mentioned above, the method defines a method of operating a communications network by use of a self learning management system, which is compatible with International Telecommunications Union-Telecommunication Standardisation sector (ITU-T) and with $3^{rd}$ Generation Partnership Program (3GPP) standards and which provides an improvement of the performance of the network entities, management systems, and the interfaces in a management network of a communications network.

Further, the tasks of operators are optimized and it becomes possible to set individual quality parameters before the application of the methodology of a self learning management is started. Furthermore, such a kind of management can be incorporated step wise into the communications network as every kind of network entities can be treated separately in the learning method. Additionally, the present methodology is independent with regard to communications protocols used at the manager-agent-interfaces. Furthermore, it can be used in several communications networks like telecommunications networks.

It is noted that the present invention is not restricted to the above embodiments but can be applied in connection with any communications system comprising a management network with several managing levels and in which the operation and management of network entities and events has to be performed. As already pointed out above, several ways of implementation of the methodology enabling a self learning management system are possible according to the present invention.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method of operating a communications network, in which a set of derived events occurs in dependence on or in response to a primary event, the method comprising:
    implementing a learning method for predicting a predicted set of derived events by analyzing the primary event and by predicting the predicted set of derived events based on data including relations between network entities and/or events in the communications network, the derived events including events associated with forwarding information between network entities;
    generating, at a managing level, the predicted set of derived events when the primary event is forwarded from an agent level to the managing level;
    stopping forwarding of derived events actually occurring in the communications network from the agent level to the managing level; and
    using, at the managing level, the predicted set of derived events, instead of the derived events actually occurring in the communications network, to support operation of the communications network.

2. The method according to claim 1, further comprising collecting information regarding derived events that actually occur in the communications network.

3. The method according to claim 2, wherein information regarding the derived events actually occurring is collected in a dedicated log.

4. The method according to claim 2, wherein after a predetermined interval of time, the information regarding derived events actually occurring is read and then compared with the set of derived events that were predicted.

5. The method according to claim 4, wherein the set of derived events that were predicted is updated with respect to the derived events actually occurring, if there are differences between the derived actually occurring and the derived events that were predicted.

6. The method according to claim 1, wherein for derived events associated with forwarding information between network entities, the generation of the derived events and/or of data related to the derived events is stopped.

7. The method according to claim 1, wherein the method further comprises collecting and/or structuring of data associated with the relations between network entities and/or events.

8. The method according to claim 7, wherein collecting and/or structuring of data further comprises a first collecting of network entity related dependency data and a second collecting of network configuration related data.

9. The method according to claim 8, wherein collecting and/or structuring of data further comprises generating a base set of primary events based on at least one of: the first collecting and the second collecting.

10. The method according to claim 9, wherein
    collecting and/or structuring of data further comprises generating at least one of a base set of operator information and a base set of derived events,
    the operator information in the base set of operator information is connected to at least one primary event of the base set of primary events, and
    each derived event in the base set of derived events is connected to at least one primary event in the base set of primary events.

11. The method according to claim 1, wherein the method is implemented in a managing level of a management network of communications network.

12. The method according to claim 1, wherein implementing the learning method comprises comparing the set of derived events that were predicted with the set of derived events actually occurring, and updating the set of derived events that were predicted, if differences are identified.

13. The method according to claim 12, wherein the set of derived events actually occurring is provided by at least one network entity to which the set of derived events and/or the primary event corresponds.

14. The method according to any one of claim 12, wherein implementing the learning method comprises annotating correctly predicted derived events and/or annotating how many derived events were correctly predicted.

15. The method according to any one of claim 12, wherein the learning method is terminated, if annotation indicates a good quality prediction.

16. The method according to claim 13,
    wherein the set of derived events is collected in a collecting related to the network entity to which the set of derived events corresponds and/or related to the primary event to which the set of derived events corresponds, and wherein the set of derived events are collected in at least temporarily, and/or wherein the comparison is performed with regard to at least one interval of time.

17. The method according to claim 16, wherein the set of derived events is collected at an agent level of a management network of the communications network.

18. The method according to claim 16, wherein implementing the learning method comprises a determining at least one event and/or at least one command in response to the primary event and/or to the set of derived events.

19. The method according to claim 1, wherein operating the communications network is supported by determining an event and/or command to be initiated in response to the primary event and/or the set of derived events.

20. A non-transitory computer program storage medium storing a program, which when executed by a computer, causes the computer to perform a method of operating a communications network, in which a set of derived events occurs in dependence on or in response to a primary event, the method comprising:

implementing a learning method for predicting a predicted set of derived events by analyzing the primary event and by predicting the predicted set of derived events based on data including relations between network entities and/or events in the communications network, the derived events including events associated with forwarding information between network entities;

generating, at a managing level, the predicted set of derived events when the primary event is forwarded from an agent level to the managing level;

stopping forwarding of derived events actually occurring in the communications network from the agent level to the managing level; and using, at the managing level, the predicted set of derived events, instead of the derived events actually occurring in the communications network, to support operation of the communications network.

21. A system to operate a communications network, in which a set of derived events occurs in dependence on or in response to a primary event, the system comprising:

a predictor to predict a predicted set of derived events by analyzing the primary event and by predicting the predicted set of derived events based on data including relations between network entities and/or events in the communications network, the derived events including events associated with forwarding information between network entities;

a generator to generate, at a managing level, the predicted set of derived events when the primary event is forwarded from an agent level to the managing level;

a terminator to stop forwarding of derived events actually occurring in the communications network network from the agent level to the managing level; and a controller to use, at the managing level, the predicted set of derived events, instead of the derived events actually occurring in the communications network, to support operation of the communications network.

22. A system according to claim 21, further comprising a processor to collect and/or structure data associated with the relations between network entities and/or events.

23. The system according to claim 21, wherein at least one of the predictor, the terminator and the controller is an entity of a managing level of a management network of the communications network.

* * * * *

UNITED STATES PATENT AND TRADEMARK OFFICE
CERTIFICATE OF CORRECTION

PATENT NO. : 8,396,818 B2
APPLICATION NO. : 12/449666
DATED : March 12, 2013
INVENTOR(S) : Lucian Hirsch It is certified that error appears in the above-identified patent and that said Letters Patent is hereby corrected as shown below:

In the claims

| | |
|---|---|
| Column 14, Line 56, | In Claim 14, after "to" delete "any one of". |
| Column 14, Line 60, | In Claim 15, after "to" delete "any one of". |
| Column 16, Line 19, | In Claim 21, after "network" delete "network". |

Signed and Sealed this
Eleventh Day of June, 2013

Teresa Stanek Rea
*Acting Director of the United States Patent and Trademark Office*